United States Patent
Park

(10) Patent No.: US 9,927,875 B2
(45) Date of Patent: Mar. 27, 2018

(54) HAPTIC FEEDBACK APPARATUS AND METHOD USING VIBRATION ATMOSPHERE COMPENSATION ALGORITHM

(71) Applicant: Hyundai Mobis Co., Ltd., Seoul (KR)

(72) Inventor: Sang Hoon Park, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 103 days.

(21) Appl. No.: 14/725,978

(22) Filed: May 29, 2015

(65) Prior Publication Data

US 2016/0109949 A1 Apr. 21, 2016

(30) Foreign Application Priority Data

Oct. 15, 2014 (KR) .......................... 10-2014-0138963

(51) Int. Cl.
*G06F 3/01* (2006.01)
*G06F 3/041* (2006.01)

(52) U.S. Cl.
CPC ............ *G06F 3/016* (2013.01); *G06F 3/0416* (2013.01); *G06F 3/0418* (2013.01)

(58) Field of Classification Search
CPC ....... G06F 3/016; G06F 3/0418; G06F 3/0416
See application file for complete search history.

(56) References Cited

U.S. PATENT DOCUMENTS

| | | | | |
|---|---|---|---|---|
| 2007/0097073 A1* | 5/2007 | Takashima | .............. | G06F 3/016 345/156 |
| 2014/0092055 A1* | 4/2014 | Radivojevic | ............ | G06F 3/016 345/174 |
| 2015/0003204 A1* | 1/2015 | Cheatham, III | ........ | G06F 3/016 367/93 |
| 2015/0097796 A1* | 4/2015 | Lisseman | ................. | B62D 1/04 345/173 |

FOREIGN PATENT DOCUMENTS

| | | |
|---|---|---|
| JP | 2012-176640 | 9/2012 |
| KR | 10-2006-0047110 | 5/2006 |
| KR | 10-0995895 | 11/2010 |

* cited by examiner

*Primary Examiner* — Towfiq Elahi
(74) *Attorney, Agent, or Firm* — H.C. Park & Associates, PLC

(57) ABSTRACT

A haptic feedback apparatus using a vibration atmosphere compensation algorithm may include: a vibration sensor configured to collect vibration atmosphere data; a memory configured to store a pattern for compensating for the vibration atmosphere and a haptic pattern corresponding to a touch input; a controller configured to generate a pattern for compensating for the vibration atmosphere based on the vibration atmosphere data, synthesize the haptic pattern stored in the memory with a pattern for compensating for the vibration atmosphere, when a touch input of the user is detected through a touch panel, and output the synthesized haptic pattern; and an actuator configured to vibrate according to the haptic pattern outputted from the controller.

10 Claims, 5 Drawing Sheets

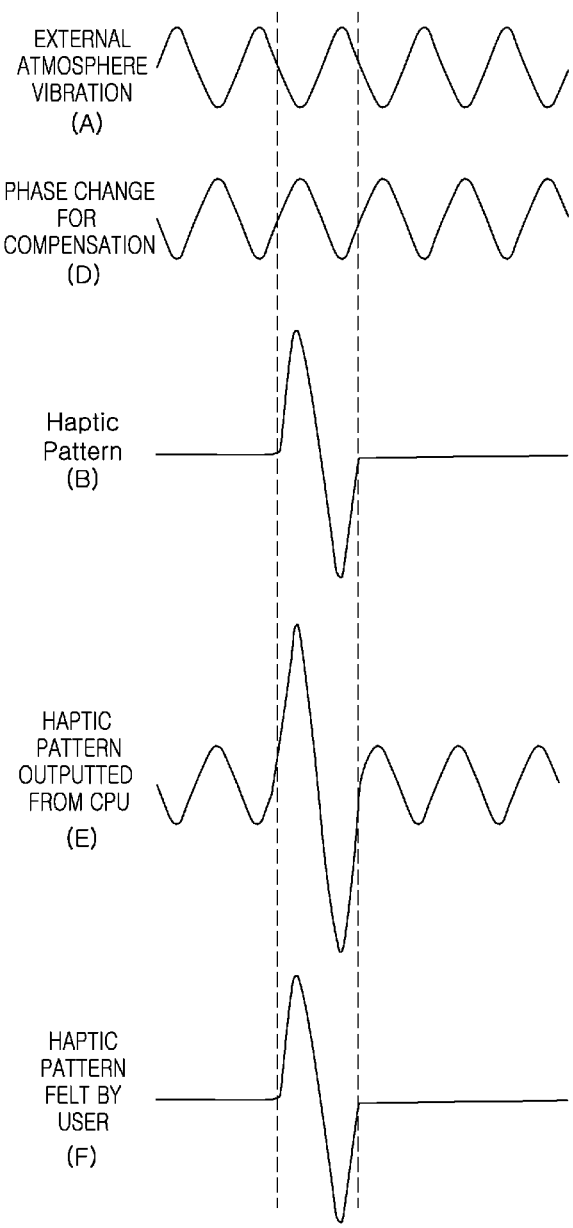

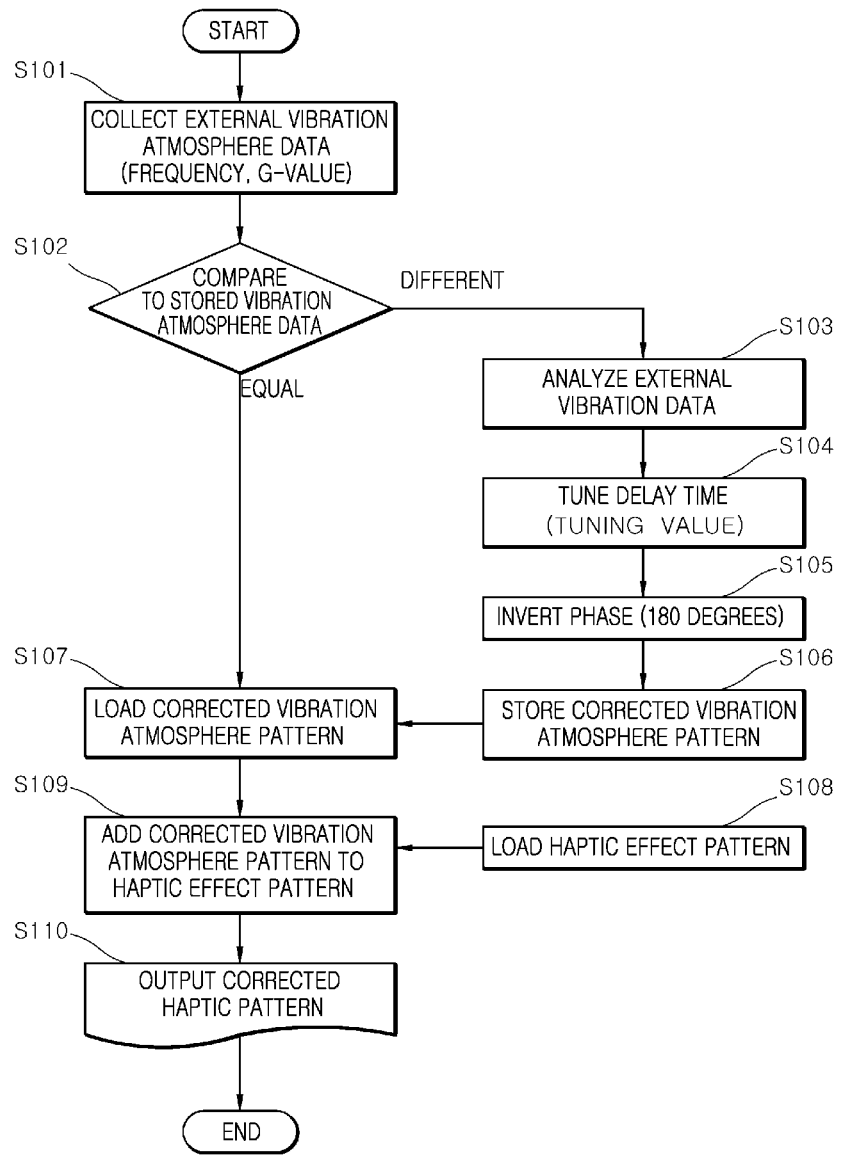

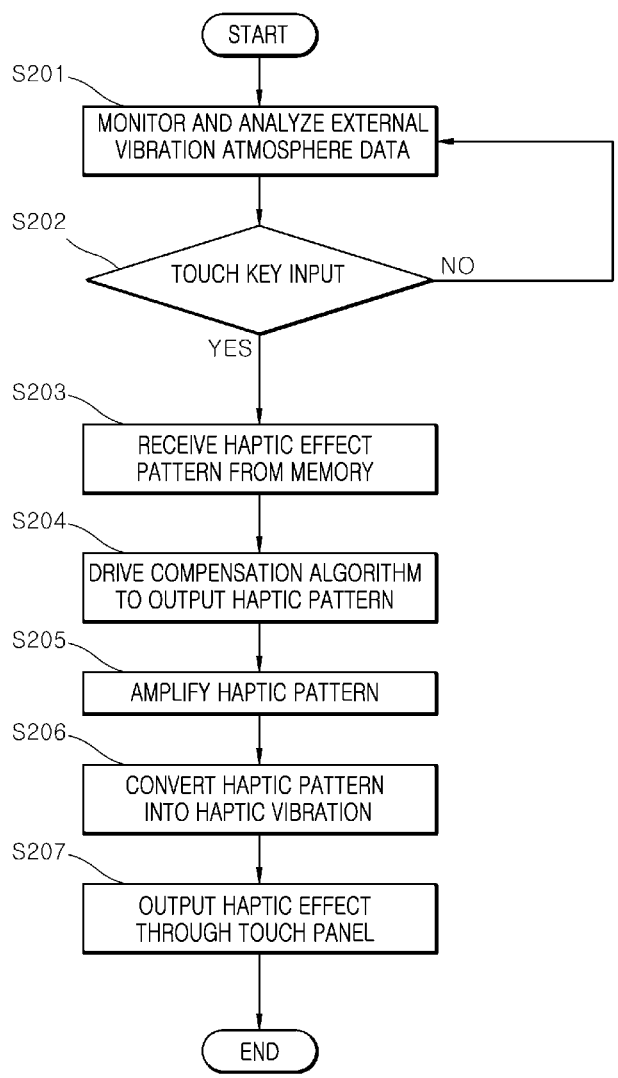

HAPTIC FEEDBACK APPARATUS AND METHOD USING VIBRATION ATMOSPHERE COMPENSATION ALGORITHM

CROSS-REFERENCES TO RELATED APPLICATION

The present application claims priority from and the benefit of Korean application number 10-2014-0138963, filed on Oct. 15, 2014, which is incorporated by reference for all purposes as if fully set forth herein.

BACKGROUND

Field

Exemplary embodiments relate to a haptic feedback apparatus and method using a vibration atmosphere compensation algorithm, and more particularly, to a haptic feedback apparatus and method using a vibration atmosphere compensation algorithm that is capable of compensating vibration noise in a vibration atmosphere, thereby providing a more accurate haptic feedback effect.

Discussion of the Background

In general, a haptic effect refers to a method through which a user can confirm whether an input was normally inputted to a device when the user applied the input through a button or touch panel. As a method for realizing feedback on the haptic effect, tactile impression is used in most cases. For example, in the case of a physical switch, a tactile impression of "click" may correspond to a haptic effect. In addition, a buzzer may be used to output a sound or an LED for a visual effect may be turned on, in order to provide a feedback effect.

In the case of a touch panel with no haptic effect, a user cannot confirm whether a button key was normally inputted according to a user's intention. Thus, the initial products having a touch panel applied thereto could check whether a signal was inputted through a buzzer sound. However, in order to provide a more intuitive haptic effect, a method capable of providing tactile impression similar to that of a physical switch is known to be the most efficient.

Thus, a touch panel to which a haptic effect is applied has recently been introduced. The touch panel vibrates a touch panel display using a magnetic element (for example, an actuator to generate vibration), and makes a user feel a haptic feedback on a key input of the user. The actuator applied to the conventional touch panel includes a fixed part and a moving part. The haptic effect can be felt by the user through relative vibration of the moving part under a condition that the fixed part is adjusted.

However, under a condition that the fixed part periodically vibrates (for example, vibration which occurs during operation of a vehicle), a haptic waveform stored in an internal memory and the vibration of the fixed part may offset each other such that the user cannot feel a haptic effect or recognizes the haptic effect as a smaller haptic effect.

The related art of the present invention is disclosed in Korean Patent No. 10-0995895 registered on Nov. 16, 2010, and entitled "Haptic Feedback Device".

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention are directed to a haptic feedback apparatus and method using a vibration atmosphere compensation algorithm that is capable of compensating vibration noise in a vibration atmosphere, thereby providing a more accurate haptic feedback effect.

Additional aspects will be set forth in the detailed description which follows, and, in part, will be apparent from the disclosure, or may be learned by practice of the inventive concept.

An exemplary embodiment of the present invention discloses a haptic feedback apparatus using a vibration atmosphere compensation algorithm, the apparatus including: a vibration sensor configured to collect vibration atmosphere data; a memory configured to store a pattern for compensating for the vibration atmosphere and a haptic pattern corresponding to a touch input; a controller configured to generate a pattern for compensating for the vibration atmosphere based on the vibration atmosphere data, synthesize the haptic pattern stored in the memory with a pattern for compensating for the vibration atmosphere, when a touch input of the user is detected through a touch panel, and output the synthesized haptic pattern; and an actuator configured to vibrate according to the haptic pattern outputted from the controller.

An exemplary embodiment of the present invention also discloses a haptic feedback method using a vibration atmosphere compensation algorithm, the method including: collecting vibration atmosphere data through a vibration sensor; detecting, by a controller, a touch input of a user through a touch panel; loading, by the controller, a haptic pattern stored in a memory, when the touch input is detected; and synthesizing, by the controller, the loaded haptic pattern with a pattern for compensating for the vibration atmosphere, the pattern being previously stored in the memory, and outputting the synthesized haptic pattern to an actuator to cause the actuator to vibrate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 3 is a diagram illustrating a haptic pattern to which the vibration atmosphere compensation algorithm is applied.

FIG. 4 is a flowchart for describing a haptic feedback method using a vibration atmosphere compensation algorithm in accordance with an exemplary embodiment of the present invention.

FIG. 5 is a flowchart for describing a haptic feedback method using a vibration atmosphere compensation algorithm in accordance with another exemplary embodiment of the present invention.

DETAILED DESCRIPTION OF THE ILLUSTRATED EMBODIMENTS

Figure 1:
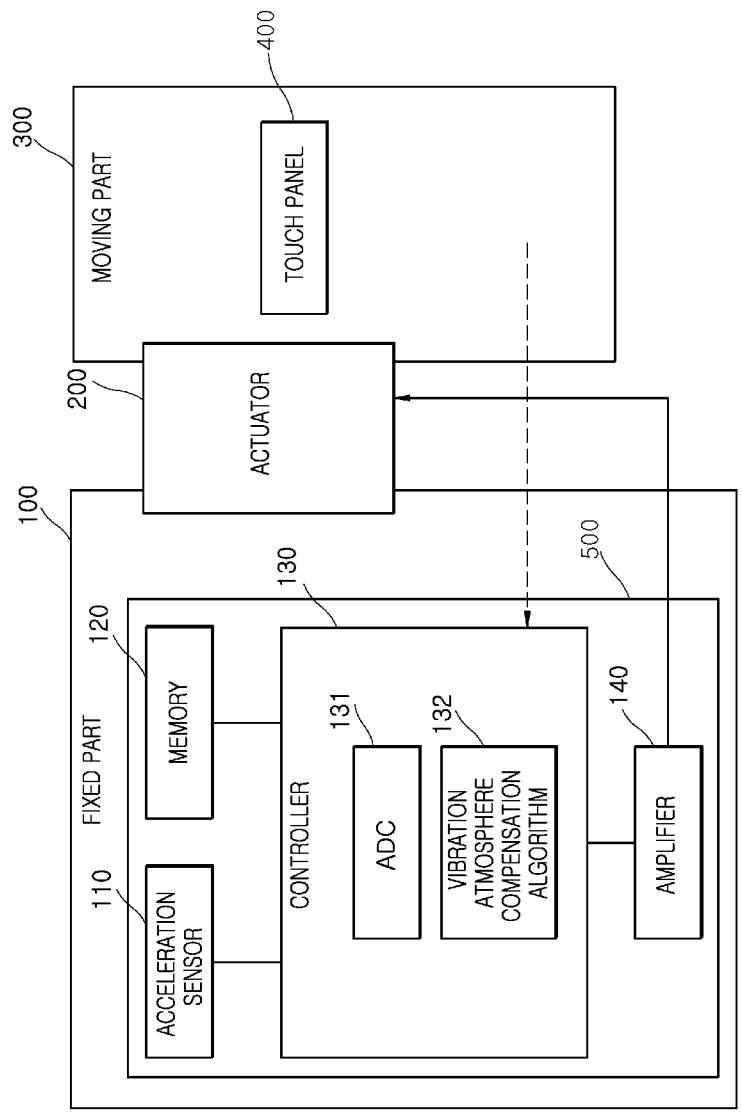
FIG. 1 is a diagram schematically illustrating the configuration of a haptic feedback apparatus using a vibration atmosphere compensation algorithm in accordance with an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

FIG. 1 is a diagram schematically illustrating the configuration of a haptic feedback apparatus using a vibration atmosphere compensation algorithm in accordance with an exemplary embodiment of the present invention.

As illustrated in FIG. 1, the haptic feedback apparatus using a vibration atmosphere compensation algorithm in accordance with an exemplary embodiment of the present invention may include a fixed part 100, a moving part 300, and an actuator 200 connected between the fixed part 100 and the moving part 300. The actuator 200 may generate a haptic effect according to a haptic pattern outputted from the fixed part 100 when a touch key is inputted through the moving part 300, and feed back the haptic effect to the moving part 300.

At this time, the moving part 300 may include a touch panel 400 formed thereon, and the fixed part 100 may include an electronic circuit 500 which generates a haptic effect (that is, a haptic effect obtained by compensating for a vibration atmosphere) corresponding to a touch inputted through the moving part 300, and feeds back the haptic effect to the moving part 300 through the actuator 200.

Hereafter, the configuration of the fixed part 100 will be described in more detail.

The electronic circuit 500 included in the fixed part 100 may include an acceleration sensor 110, a memory 120, a controller 130, and an amplifier 140. The controller 130 may include an analog-to-digital (AD) converter 131 and a vibration atmosphere compensation algorithm 132. The vibration atmosphere compensation algorithm 132 may be previously stored in the memory 120.

The acceleration sensor 110 may detect vibration information, but may other types of sensors may also be used to detect vibration information.

The memory 120 may store a haptic pattern which a user can feel in an atmosphere where no vibration occurs. Furthermore, when a request is made from the controller 130, the memory 120 may transmit a corresponding haptic effect pattern.

The controller 130 may receive analog vibration information detected through the acceleration sensor (or vibration detection sensor), and convert the analog vibration information into a digital signal through the AD converter 131. The controller 130 may acquire a vibration atmosphere condition (for example, vibration frequency and vibration level) from the vibration information.

The controller 130 may correct the haptic effect pattern stored in the memory 120, based on the vibration atmosphere condition (for example, vibration frequency and vibration level) received from the acceleration sensor 110. At this time, the controller 130 may use the vibration atmosphere compensation algorithm 132 in order to correct the haptic effect pattern (refer to FIGS. 4 and 5).

The vibration atmosphere compensation algorithm 132 may generate the corrected haptic effect, which needs to be generated from the actuator 200, in consideration of a haptic effect desired by a user and the user atmosphere (vibration acceleration of the fixed part).

The amplifier 140 may output a signal amplified to a voltage level at which the actuator can be operated, according to the haptic effect pattern which is outputted from the controller 130 so as to drive the actuator.

The moving part 300 may receive a touch input from a user through a touch panel formed (or installed) thereon, output an input signal to the controller 130, vibrate according to the haptic pattern generated from the actuator 200, and feed back a physical haptic effect to the user.

The actuator 200 may be driven in response to the haptic pattern signal amplified through the amplifier 140, and transmit a haptic pattern effect based on the operation of the actuator 200 to the moving part 300 having the touch panel 400 formed thereon.

Figure 2:
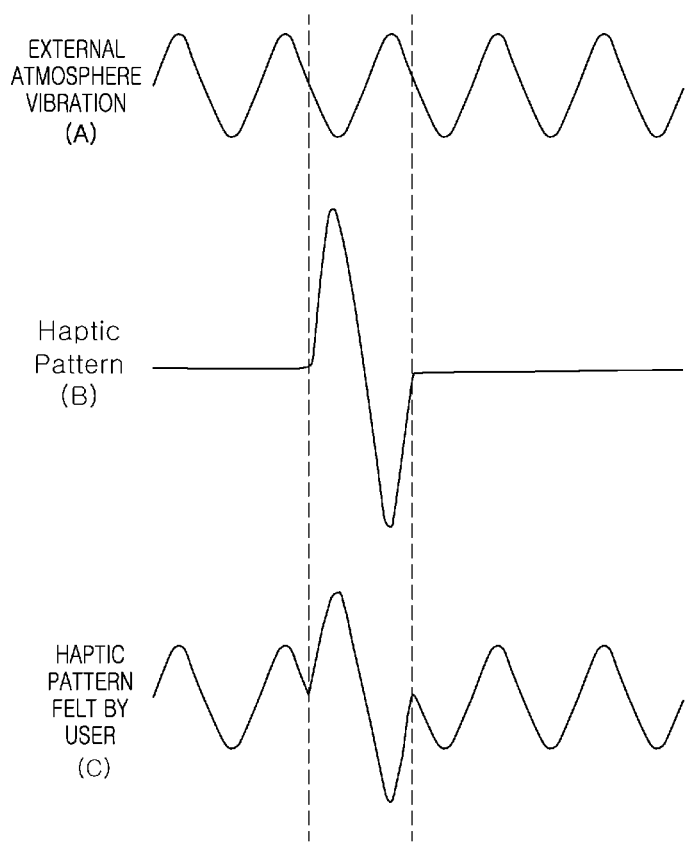
FIG. 2 is a diagram illustrating a haptic pattern prior to application of the vibration atmosphere compensation algorithm in accordance with the exemplary embodiment of the present invention.

FIG. 2 is a diagram illustrating a haptic pattern prior to application of the vibration atmosphere compensation algorithm in accordance with the exemplary embodiment of the present invention, and FIG. 3 is a diagram illustrating a haptic pattern to which the vibration atmosphere compensation algorithm is applied.

Referring to FIG. 2, when a haptic pattern B is outputted in a state where external atmosphere vibration A is occurring, a haptic pattern C felt by a user may be significantly distorted from the haptic pattern B that is intended to be outputted. Thus, the user may feel a haptic effect which is totally different from a haptic effect that could be provided through the haptic pattern which was intended to be outputted, or may not accurately feel a haptic effect.

Next, referring to FIG. 3, when a haptic pattern B is outputted in a state where external atmosphere vibration A is occurring, the controller 130 may output a phase change pattern D for offsetting the external atmosphere vibration A, and compensate for the vibration atmosphere. Then, the controller 130 may output a haptic pattern E in which the haptic pattern B intended to be outputted and a vibration atmosphere pattern obtained by compensating for the vibration atmosphere are synthesized.

At this time, as the vibration atmosphere pattern obtained by compensating for the vibration atmosphere offsets actual vibration, a haptic pattern F felt by the user may be equalized to the haptic pattern B intended to be outputted. Thus, the user may feel a haptic effect based on the haptic pattern which was intended to be outputted, even in the vibration atmosphere.

FIG. 4 is a flowchart for describing a haptic feedback method using a vibration atmosphere compensation algorithm in accordance with an exemplary embodiment of the present invention.

As illustrated in FIG. 4, the controller 130 may collect external vibration atmosphere data (for example, vibration frequency and vibration level (G-value)) in real time at step S101.

The external vibration atmosphere data (or external vibration data) may be sensed through a vibration sensor, such as, for example, an acceleration sensor.

The controller 130 may compare the external vibration atmosphere data collected in real time to the vibration atmosphere data stored in the memory 120, at step S102.

According to the comparison result, when the external vibration atmosphere data collected in real time are different from the vibration atmosphere data stored in the memory 120, the controller 130 may analyze the external vibration data at step S103.

Furthermore, the controller 130 may tune a delay time for the analyzed external vibration data at step S104. That is, the controller 130 may tune a time required while the vibration information collected from the vibration sensor is processed.

Then, the controller 130 may generate a vibration atmosphere pattern (that is, vibration atmosphere compensation pattern) of which the phase is inverted by 180 degrees with respect to the external vibration data obtained by compensating for the delay time, and store the vibration atmosphere pattern in the memory 120, at steps S105 and S106, respectively.

According to the comparison result, when the external vibration atmosphere collected in real time and the vibration atmosphere data stored in the memory 120 are equal to each other or different from each other, the controller 130 may load the vibration atmosphere compensation pattern which is previously generated and stored, at step S107.

Furthermore, the controller 130 may load the haptic effect pattern (or haptic pattern) that was intended to be outputted, from the memory 120, and synthesize the haptic effect pattern with the vibration atmosphere compensation pattern, at step S109. That is, the controller 130 may add the haptic effect pattern to the vibration atmosphere compensation pattern.

Then, the controller 130 may output the corrected haptic pattern (that is, the haptic pattern obtained by synthesizing the haptic effect pattern with the corrected vibration atmosphere pattern) through the actuator 200, at step S110.

Thus, as the corrected vibration atmosphere pattern offsets vibration that actually occurs in the system (for example, vehicle), the user may feel a haptic effect caused by the haptic pattern (that is, a haptic pattern intended to be outputted).

FIG. 5 is a flowchart for describing a haptic feedback method using a vibration atmosphere compensation algorithm in accordance with another exemplary embodiment of the present invention.

As illustrated in FIG. 5, the controller 130 may collect and analyze external vibration data which occurs in a vehicle, using a vibration sensor (for example, acceleration sensor), at step S201.

The collecting and analyzing of the external vibration data may be continuously performed regardless of whether a touch is inputted. When the external vibration data is varied while being monitored, the controller 130 may previously generate a pattern for compensating for (or correcting) the vibration (vibration atmosphere compensation pattern) and store the pattern in the memory 120.

Furthermore, when a touch key input of the user is detected through the moving part 300 (for example, the touch panel 400) at step S202, the moving part 300 may receive the haptic effect pattern (that is, haptic pattern) stored in the memory 120 at step S203, and drive the vibration atmosphere compensation algorithm 132 to output a haptic pattern obtained by compensating for the vibration atmosphere, at step S204.

Furthermore, the haptic pattern obtained by compensating for the vibration atmosphere may be amplified and outputted at step S205.

The amplified and outputted haptic pattern may be converted into haptic vibration through the actuator 200. When the actuator 200 haptic-vibrates, the moving part 300 (that is, touch panel 400) which is physically connected to the actuator 200 may vibrate to output a haptic effect, at step S207. That is, the user touching the moving part 300 with a part of the body (for example, finger) may feel a haptic effect.

In accordance with the exemplary embodiments of the present invention, the haptic feedback apparatus and method may compensate for vibration noise in a vibration atmosphere, thereby providing a more accurate haptic feedback effect.

Although certain exemplary embodiments and implementations have been described herein, other exemplary embodiments and modifications will be apparent from this description. Accordingly, the inventive concept is not limited to such embodiments, but rather to the broader scope of the presented claims and various obvious modifications and equivalent arrangements.

What is claimed is:

1. A haptic feedback apparatus comprising:
a vibration sensor configured to collect vibration atmosphere data;
a memory configured to store a pattern for compensating for the vibration atmosphere, a vibration atmospheric compensation algorithm, and a haptic pattern corresponding to a touch input;
a controller configured to:
generate a pattern for compensating for the vibration atmosphere based on the vibration atmosphere data;
synthesize the haptic pattern stored in the memory with the pattern for compensating for the vibration atmosphere by using the vibration atmospheric compensation algorithm, when a touch input of the user is detected through a touch panel; and
output the synthesized haptic pattern;
an actuator configured to vibrate according to the haptic pattern outputted from the controller;
a moving part comprising the touch panel formed thereon; and
a fixed part comprising an electronic circuit comprising the memory and the controller formed therein, in order to generate a haptic effect corresponding to a touch inputted through the moving part and then feed back the haptic effect to the moving part,
wherein:
the controller is configured to continuously monitor the vibration atmosphere data regardless of whether a touch is inputted, generate a pattern for compensating the vibration atmosphere when the vibration atmosphere data is changed, and store the generated pattern in the memory; and
the actuator is installed between the moving part and the fixed part, generates a physical haptic effect according to a haptic pattern outputted from the fixed part when a touch is inputted through the moving part, and feeds back the haptic effect to the moving part.

2. The haptic feedback apparatus of claim 1, further comprising an analog-to-digital (AD) converter configured to convert analog vibration information sensed through the vibration sensor into digital information,
wherein the controller is configured to acquire a vibration atmosphere condition containing a vibration frequency and vibration level information from the digital information.

3. The haptic feedback apparatus of claim 1, wherein the pattern for compensating for the vibration atmosphere comprises a pattern of which the phase is inverted by 180 degrees with respect to the vibration atmosphere data.

4. The haptic feedback apparatus of claim 1, wherein, when generating the pattern for compensating for the vibration atmosphere, the controller is configured to additionally perform a delay time tuning operation for tuning a time required while the vibration information collected by the vibration sensor is processed.

5. The haptic feedback apparatus of claim 1, further comprising an amplifier configured to amplify the haptic pattern outputted from the controller to a voltage level at which the actuator is operated.

6. A haptic feedback method comprising:
collecting vibration atmosphere data through a vibration sensor;
detecting, by a controller, a touch input of a user through a touch panel;
loading, by the controller, a haptic pattern stored in a memory, when the touch input is detected; and
synthesizing, by the controller, the loaded haptic pattern with a pattern for compensating for the vibration atmosphere using a vibration atmosphere compensation algorithm, the pattern for compensating for the vibration atmosphere and the vibration atmosphere compensation algorithm being previously stored in the memory, and outputting the synthesized haptic pattern to an actuator such that the actuator vibrates,
wherein:
the controller continuously monitors the vibration atmosphere data regardless of whether a touch is inputted, generates a pattern for compensating the vibration atmosphere when the vibration atmosphere data is changed, and stores the generated pattern in the memory;
the actuator is installed between a moving part and a fixed part, generates a physical haptic effect according to the haptic pattern outputted from the fixed part when the touch input is detected through the moving part; and
the moving part comprises the touch panel formed thereon, and the fixed part comprises an electronic circuit comprising the memory and the controller formed therein, in order to generate the haptic effect corresponding to the touch input and then feed back the haptic effect to the moving part.

7. The haptic feedback method of claim 6, further comprising, after the collecting of the vibration atmosphere data:
generating, by the controller, the pattern for compensating for the vibration atmosphere based on the vibration atmosphere data; and
storing, by the controller, the generated pattern in the memory.

8. The haptic feedback method of claim 6, further comprising, after the collecting of the vibration atmosphere data:
converting, by the controller, analog vibration information sensed through the vibration sensor into digital information; and
acquiring, by the controller, a vibration atmosphere condition containing a vibration frequency and vibration level information from the digital information to form a vibration atmosphere pattern.

9. The haptic feedback method of claim 8, wherein the pattern for compensating for the vibration atmosphere is generated by inverting the phase of the vibration atmosphere pattern by 180 degrees with respect to the vibration atmosphere data.

10. The haptic feedback method of claim 6, wherein in the outputting of the synthesized haptic pattern to the actuator, the controller controls an amplifier to amplify the synthesized haptic pattern to a voltage level at which the actuator is operated.

* * * * *